United States Patent Office 3,000,945
Patented Sept. 19, 1961

3,000,945
N,N'-BIS-NITROALKYL-OXAMIDES
Milton B. Frankel, Pasadena, Calif., assignor to Aerojet-General Corporation, Azusa, Calif., a corporation of Ohio
No Drawing. Filed Oct. 30, 1957, Ser. No. 693,783
15 Claims. (Cl. 260—561)

This invention relates to new compositions of matter and a method for their preparation. In particular this invention relates to aliphatic polynitro oxamides having the general formula:

$$R-\underset{\underset{NO_2}{|}}{\overset{\overset{NO_2}{|}}{C}}-A-NH-\overset{O}{\overset{\|}{C}}-\overset{O}{\overset{\|}{C}}-NH-A-\underset{\underset{NO_2}{|}}{\overset{\overset{NO_2}{|}}{C}}-R$$

wherein R is a hydrogen, nitro, alkyl, or nitroalkyl radical and A is an alkylene radical.

These compounds, due to their high oxygen content, find valuable use as high explosives and can be used in any conventional explosive missile, projectile, rocket, or the like, as the main explosive charge. An example of such a missile is disclosed in U.S. Patent No. 2,470,162, issued May 17, 1949. One way of using the high explosives in a device such as that disclosed in U.S. Patent No. 2,470,162 is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time-fuse mechanism firing a detonating explosive such as lead azide or mercury fulminate.

The compounds of this invention are readily prepared by condensing a geminal polynitro amine with an oxalyl compound in accordance with the general reaction scheme set forth below:

$$2R-\underset{\underset{NO_2}{|}}{\overset{\overset{NO_2}{|}}{C}}-A-NH_2+R'-\overset{O}{\overset{\|}{C}}-\overset{O}{\overset{\|}{C}}-R' \quad R-\underset{\underset{NO_2}{|}}{\overset{\overset{NO_2}{|}}{C}}-A-NH-\overset{O}{\overset{\|}{C}}-\overset{O}{\overset{\|}{C}}-NH-A-\underset{\underset{NO_2}{|}}{\overset{\overset{NO_2}{|}}{C}}-R$$

wherein R and A are as defined above, and R' is a halogen or alkoxy radical.

To more clearly illustrate my invention, the following examples are presented. It is to be understood, however, that these examples are presented merely as a means of illustration, and are not intended to limit the scope of the invention in any way.

EXAMPLE I

*Preparation of N,N'-bis(3,3,3-trinitropropyl) oxamide*

A solution of 219 gm. (1.13 moles) 3,3,3-trinitropropyl amine in ether was cooled to 5° C. and a solution of 35.5 gm. (0.28 mole) of oxalyl chloride in 150 ml. of ether was added dropwise. A white solid immediately separated. The reaction mixture was stirred for 1 hour at 5° C. and filtered. The product, which was water-insoluble, was dried in vacuo over potassium hydroxide and recrystallized from methanol. The yield was 56 gm. (45.3%), M.P. 195–197° C., and exhibited an impact stability of 45 cm./2.5 kg. The elemental analysis of the product is as follows:

Calculated for $C_8H_{10}N_8O_{14}$: C, 21.73%; H, 2.28%; N, 25.34%. Found: C, 22.06%; H, 2.32%; N, 25.31%.

Heat of combustion, $H_p$, predicted: 2175 cal./gm. Found: 2146 cal./gm.

EXAMPLE II

*Preparation of N,N'-bis(3,3-dinitrobutyl) oxamide*

To a solution of 28.5 gm. (0.175 mole) of 3,3-dinitrobutyl amine in chloroform was added 2.8 gm. (0.008 mole) of ethyl oxalate. The reaction mixture was refluxed for 2 hours and then concentrated in vacuo leaving a cream-colored solid. Recrystallization from ethylene dichloride yielded 13.0 gm. (39%) of white crystals, M.P. 190–191° C. The elemental analysis of the product is as follows:

Calculated for $C_{10}H_{16}N_6O_{10}$: C, 31.58%; H, 4.24%; N, 22.10%. Found: C, 31.75%; H, 4.43%; N, 22.65%.

The amines useful as starting materials in the practice of this invention are generated from strong mineral acid salts thereof, such as nitric acid salts, by neutralization with an inorganic basic salt of an alkali or alkaline earth metal, such as sodium hydroxide. The strong mineral acid salts of the amines, such as the nitric acid salt of 3,3-dinitrobutyl amine, are prepared by reacting the corresponding isocyanate, such as 3,3-dinitrobutyl isocyanate, with a dilute aqueous solution of a strong mineral acid, such as dilute nitric acid, as more fully disclosed in my copending U.S. patent application Ser. No. 617,666, filed October 22, 1956, now Patent No. 2,978,509.

Any diester of acyl dihalide or oxalic acid, such as oxalyl chloride, oxalyl bromide, ethyl oxalate, n-butyl oxalate, etc., can be used for the condensation reaction of this invention, although ethyl oxalate and oxalyl chloride are preferred for reasons of economy and convenience.

Reaction temperature is not critical in the practice of this invention, and can be both higher and lower than those given in the examples, the only effect of temperature variation being a corresponding increase or decrease in reaction rate.

It will be appreciated that a wide variety of oxamide compounds can be prepared in accordance with the method of my invention. For example, 3,3-dinitropentyl amine; 4,4-dinitrobutyl amine; and 5,5,7,7-tetranitroheptyl amine condense with oxalyl compounds to form N,N'-bis(3,3-dinitropentyl) oxamide; N,N'-bis(4,4-dinitrobutyl) oxamide; and N,N'-bis(5,5,7,7-tetranitroheptyl) oxamide, respectively. Similarly, mixtures of 4,4-dinitrobutyl amine and 3,3-dinitrobutyl amine react with oxalyl compounds such as ethyl oxalate to yield, among other oxamide products, N-(3,3-dinitrobutyl)-N'-(4,4-dinitrobutyl) oxamide.

It is apparent that any nitramine of this series may be condensed with oxalyl compounds, in accordance with the teachings of this invention, to produce polynitro oxamides.

This application is a continuation-in-part of my copending U.S. Patent application Ser. No. 408,610, filed February 5, 1954, now abandoned.

I claim:

1. As compositions of matter, the aliphatic polynitro oxamides having the formula:

$$R-\underset{\underset{NO_2}{|}}{\overset{\overset{NO_2}{|}}{C}}-A-NH-\overset{O}{\overset{\|}{C}}-\overset{O}{\overset{\|}{C}}-NH-A-\underset{\underset{NO_2}{|}}{\overset{\overset{NO_2}{|}}{C}}-R$$

wherein R is a radical selected from the group consisting of hydrogen, nitro, lower alkyl, and lower nitroalkyl radicals and A is a lower alkylene radical.

2. As compositions of matter, the aliphatic polynitro oxamides having the formula:

$$H-\underset{NO_2}{\overset{NO_2}{\underset{|}{\overset{|}{C}}}}-A-NH-\overset{O}{\overset{\|}{C}}-\overset{O}{\overset{\|}{C}}-NH-A-\underset{NO_2}{\overset{NO_2}{\underset{|}{\overset{|}{C}}}}-H$$

wherein A is a lower alkylene radical.

3. As compositions of matter, the aliphatic polynitro oxamides having the formula:

$$NO_2-\underset{NO_2}{\overset{NO_2}{\underset{|}{\overset{|}{C}}}}-A-NH-\overset{O}{\overset{\|}{C}}-\overset{O}{\overset{\|}{C}}-NH-A-\underset{NO_2}{\overset{NO_2}{\underset{|}{\overset{|}{C}}}}-NO_2$$

wherein A is a lower alkylene radical.

4. As compositions of matter, the aliphatic polynitro oxamides having the formula:

$$R-\underset{NO_2}{\overset{NO_2}{\underset{|}{\overset{|}{C}}}}-A-NH-\overset{O}{\overset{\|}{C}}-\overset{O}{\overset{\|}{C}}-NH-A-\underset{NO_2}{\overset{NO_2}{\underset{|}{\overset{|}{C}}}}-R$$

wherein A is a lower alkylene radical and R is a lower alkyl radical.

5. As compositions of matter, the aliphatic polynitro oxamides having the formula:

$$R-\underset{NO_2}{\overset{NO_2}{\underset{|}{\overset{|}{C}}}}-A-NH-\overset{O}{\overset{\|}{C}}-\overset{O}{\overset{\|}{C}}-NH-A-\underset{NO_2}{\overset{NO_2}{\underset{|}{\overset{|}{C}}}}-R$$

wherein A is a lower alkylene radical and R is a lower nitroalkyl radical.

6. As a composition of matter, N,N'-bis(3,3,3-trinitropropyl) oxamide having the structural formula:

$$NO_2-\underset{NO_2}{\overset{NO_2}{\underset{|}{\overset{|}{C}}}}-CH_2CH_2-NH-\overset{O}{\overset{\|}{C}}-\overset{O}{\overset{\|}{C}}-NH-CH_2CH_2-\underset{NO_2}{\overset{NO_2}{\underset{|}{\overset{|}{C}}}}-NO_2$$

7. As a composition of matter, N,N'-bis(3,3-dinitrobutyl) oxamide having the structural formula:

$$CH_3-\underset{NO_2}{\overset{NO_2}{\underset{|}{\overset{|}{C}}}}-CH_2CH_2-NH-\overset{O}{\overset{\|}{C}}-\overset{O}{\overset{\|}{C}}-NH-CH_2CH_2-\underset{NO_2}{\overset{NO_2}{\underset{|}{\overset{|}{C}}}}-CH_3$$

8. As a composition of matter, N,N'-bis(4,4-dinitrobutyl) oxamide having the structural formula:

$$H-\underset{NO_2}{\overset{NO_2}{\underset{|}{\overset{|}{C}}}}-CH_2CH_2CH_2-NH-\overset{O}{\overset{\|}{C}}-\overset{O}{\overset{\|}{C}}-NH-CH_2CH_2CH_2-\underset{NO_2}{\overset{NO_2}{\underset{|}{\overset{|}{C}}}}-H$$

9. As a composition of matter, N,N'-bis(5,5,7,7-tetranitroheptyl) oxamide having the structural formula:

$$H-\underset{NO_2}{\overset{NO_2}{\underset{|}{\overset{|}{C}}}}-CH_2-\underset{NO_2}{\overset{NO_2}{\underset{|}{\overset{|}{C}}}}-CH_2CH_2CH_2-$$

$$-NH-\overset{O}{\overset{\|}{C}}-\overset{O}{\overset{\|}{C}}-NH-CH_2CH_2CH_2CH_2-\underset{NO_2}{\overset{NO_2}{\underset{|}{\overset{|}{C}}}}-CH_2-\underset{NO_2}{\overset{NO_2}{\underset{|}{\overset{|}{C}}}}-H$$

10. As a composition of matter, N-(3,3-dinitrobutyl)-N'-(4,4-dinitrobutyl) oxamide having the structural formula:

$$H-\underset{NO_2}{\overset{NO_2}{\underset{|}{\overset{|}{C}}}}-CH_2CH_2CH_2-NH-\overset{O}{\overset{\|}{C}}-\overset{O}{\overset{\|}{C}}-NH-CH_2CH_2-\underset{NO_2}{\overset{NO_2}{\underset{|}{\overset{|}{C}}}}-CH_3$$

11. The method of preparing aliphatic polynitro oxamides having the formula:

$$R-\underset{NO_2}{\overset{NO_2}{\underset{|}{\overset{|}{C}}}}-A-NH-\overset{O}{\overset{\|}{C}}-\overset{O}{\overset{\|}{C}}-NH-A-\underset{NO_2}{\overset{NO_2}{\underset{|}{\overset{|}{C}}}}-R$$

which comprises condensing an amine having the formula:

$$R-\underset{NO_2}{\overset{NO_2}{\underset{|}{\overset{|}{C}}}}-A-NH_2$$

with an oxalyl compound having the formula:

$$R'-\overset{O}{\overset{\|}{C}}-\overset{O}{\overset{\|}{C}}-R'$$

wherein R is a radical selected from the group consisting of hydrogen, nitro, lower alkyl and lower nitroalkyl radicals; A is a lower alkylene radical; and R' is a radical selected from the group consisting of alkoxy and halogen radicals.

12. The method of preparing aliphatic polynitro oxamides having the formula:

$$NO_2-\underset{NO_2}{\overset{NO_2}{\underset{|}{\overset{|}{C}}}}-A-NH-\overset{O}{\overset{\|}{C}}-\overset{O}{\overset{\|}{C}}-NH-A-\underset{NO_2}{\overset{NO_2}{\underset{|}{\overset{|}{C}}}}-NO_2$$

which comprises reacting an amine having the formula:

$$NO_2-\underset{NO_2}{\overset{NO_2}{\underset{|}{\overset{|}{C}}}}-A-NH_2$$

with an oxalyl compound having the formula:

$$R'-\overset{O}{\overset{\|}{C}}-\overset{O}{\overset{\|}{C}}-R'$$

wherein A is a lower alkylene radical and R' is a halide radical.

13. The method of preparing aliphatic polynitro oxamides having the formula:

$$R-\underset{NO_2}{\overset{NO_2}{\underset{|}{\overset{|}{C}}}}-A-NH-\overset{O}{\overset{\|}{C}}-\overset{O}{\overset{\|}{C}}-NH-A-\underset{NO_2}{\overset{NO_2}{\underset{|}{\overset{|}{C}}}}-R$$

which comprises condensing a polynitro amine having the formula:

$$R-\underset{NO_2}{\overset{NO_2}{\underset{|}{\overset{|}{C}}}}-A-NH_2$$

with an oxalyl compound having the formula:

$$R'-\overset{O}{\overset{\|}{C}}-\overset{O}{\overset{\|}{C}}-R'$$

wherein A is a lower alkylene radical, R is a lower alkyl radical and R' is an alkoxy radical.

14. The method of preparing N,N'-bis(3,3,3-trinitropropyl) oxamide which comprises condensing 3,3,3-trinitropropyl amine with oxalyl chloride.

15. The method of preparing N,N'-bis(3,3-dinitrobutyl) oxamide which comprises condensing 3,3-dinitrobutyl amine with ethyl oxalate.

References Cited in the file of this patent

UNITED STATES PATENTS 2,731,460   Schenck et al. _____ Jan. 17, 1956

OTHER REFERENCES

Textbook of Organic Chemistry, Wertheim 2nd ed. (1945), Blakiston Co., Philadelphia, page 310.